United States Patent
Kasirajan et al.

(10) Patent No.: US 11,039,419 B2
(45) Date of Patent: Jun. 15, 2021

(54) PAGING OPTIMIZATION FOR VENB

(71) Applicant: Parallel Wireless, Inc., Nashua, NH (US)

(72) Inventors: Karuppasamy Kasirajan, Pune (IN); Kartik Shashikant Raval, Pune (IN); Rajesh Gupta, Pune (IN); Anoop Gupta, Pune (IN); Michael Yasuhiro Saji, Brookline, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/897,179

(22) Filed: Jun. 9, 2020

(65) Prior Publication Data

US 2020/0305121 A1    Sep. 24, 2020

Related U.S. Application Data

(63) Continuation of application No. 16/051,345, filed on Jul. 31, 2018, now Pat. No. 10,681,672, which is a
(Continued)

(51) Int. Cl.
| | |
|---|---|
| *H04W 68/02* | (2009.01) |
| *H04W 8/02* | (2009.01) |
| *H04W 60/04* | (2009.01) |
| *H04W 88/16* | (2009.01) |
| *H04W 64/00* | (2009.01) |
| *H04W 8/06* | (2009.01) |

(Continued)

(52) U.S. Cl.
CPC .............. *H04W 68/02* (2013.01); *H04W 8/02* (2013.01); *H04W 8/06* (2013.01); *H04W 8/18* (2013.01); *H04W 8/26* (2013.01); *H04W 60/04* (2013.01); *H04W 64/003* (2013.01); *H04W 88/16* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 10,681,672 B2 * | 6/2020 | Kasirajan | H04W 68/02 |
| 2010/0195635 A1 * | 8/2010 | Maeda | H04W 8/26 370/338 |

(Continued)

*Primary Examiner* — Gary Lafontant
(74) *Attorney, Agent, or Firm* — Michael Y. Saji; David W. Rouille

(57) ABSTRACT

A method is described, comprising: creating, at a coordinating server, a user page cache table, the user page cache table associates a user equipment (UE) identifier with a last known location of the UE and a virtual base station instance; creating, at the coordinating server, a neighbor relation table, the neighbor relation table associates each cell to neighbor cells; receiving, at the coordinating server from a core network, a paging message for a user equipment (UE), the paging message comprises a tracking area identity (TAI), the UE identifier, and the virtual base station instance; querying, at the coordinating server, in the user page cache table based on the UE identifier received in the paging message to identify the virtual base station instance and the last known location; forwarding, from the coordinating server to the last known location of the UE, the paging message based on the queried last known location.

14 Claims, 7 Drawing Sheets

Related U.S. Application Data continuation-in-part of application No. 15/694,762, filed on Sep. 1, 2017, now Pat. No. 10,764,863.

(60) Provisional application No. 62/382,354, filed on Sep. 1, 2016.

(51) Int. Cl.
*H04W 92/02* (2009.01)
*H04W 8/26* (2009.01)
*H04W 8/18* (2009.01)

(56) References Cited

U.S. PATENT DOCUMENTS

| | | |
|---|---|---|
| 2013/0303203 A1 | 11/2013 | Wang et al. |
| 2017/0064601 A1* | 3/2017 | Kubota ................ H04W 74/00 |

* cited by examiner

PAGING OPTIMIZATION FOR VENB

CROSS-REFERENCE TO RELATED APPLICATIONS

This application is a continuation of, and claims the benefit of an earlier filing date under 35 U.S.C. § 120 based on, U.S. patent application Ser. No. 16/051,345, filed Jul. 31, 2018, and entitled "Paging Optimization For VeNB" which itself is a continuation-in-part of, and claims priority under 35 U.S.C. § 120 to, U.S. patent application Ser. No. 15/694,762, entitled "Multi-Radio Access Technology Paging" and filed on Sep. 1, 2017, which itself is a non-provisional conversion of U.S. Provisional Patent Application No. 62/382,354, entitled "Multi-Radio Access Technology Paging" and filed on Sep. 1, 2016, each of which is hereby incorporated by reference for all purposes. In addition, this application incorporates the following documents by reference in their entirety: U.S. Patent Publication No. US20140133456A1, entitled "Dynamic Multi-Access Wireless Network Virtualization," filed on Sep. 23, 2013; U.S. Patent Publication No. US20140092765A1, entitled "Heterogeneous Self-Organizing Network for Access and Backhaul," and filed on Sep. 12, 2013; U.S. Patent Publication No. US20140126410A1, entitled "Heterogeneous Self-Organizing Network for Access and Backhaul," and filed on Jan. 3, 2014; U.S. Patent Publication No. US20150173111A1, entitled "Virtualization of the Evolved Packet Core to Create a Local EPC," filed on Dec. 15, 2014; U.S. Patent Publication No. US20160029246A1, entitled "Signaling Storm Reduction from Radio Networks," filed on Jul. 22, 2015; U.S. Patent Publication No. US20160044531A1, entitled "Congestion and Overload Reduction," filed on Aug. 10, 2015; U.S. Patent Publication No. US20170237278A1, entitled "Handling Unresponsive MMEs," filed on Feb. 17, 2017; and U.S. Patent Publication No. US20160128020A1, entitled "Tracking Area Planning," filed on Nov. 2, 2015. In addition, this application also hereby incorporates by reference 3GPP specifications 3GPP TS 23.003 v.13.5.0, dated Mar. 17, 2016; 3GPP TS 36.413 v.15.2.0, dated Jun. 22, 2018; and 3GPP TS 36.331 v.15.2.1, dated Jun. 21, 2017, are also hereby incorporated by reference in its entirety for all purposes.

This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

A user equipment (UE) enters into an idle mode when its radio connection is released. Once in idle mode, if the UE needs to be reached by the network, the 3G and LTE standards define a procedure called paging. Paging involves broadcasting the UEs identity in the radio cells belonging to a set of eNodeBs or base stations grouped into tracking areas. Paging Messages are broadcasted over the location area code (LAC) for UMTS, routing area code (RAC) for GERAN, and tracking area code (TAC) for LTE area so that a Mobile Terminating Call may be answered. If the UE is present in one of the cells, it will respond to paging by performing a service request procedure. This results in the radio connection being re-established and the network becoming able to communicate with the UE for either control or data traffic.

Since many UEs in the LTE network are in idle mode at any given time, this equates to a high number of paging attempts going on a given network. A paging strategy is needed to reach the UE while reducing load and effectively utilizing paging resources.

SUMMARY

Method for paging optimization is described. In a first embodiment, a method may be disclosed, comprising: creating, at a coordinating server, a user page cache table, the user page cache table associates a user equipment (UE) identifier with the last known location of the UE and a virtual base station instance; creating, at the coordinating server, a neighbor relation table, the neighbor relation table associates each cell to neighbor cells; receiving, at the coordinating server from a core network, a paging message for a user equipment (UE), the paging message comprising a tracking area identity (TAI), the UE identifier, and the virtual base station instance; querying, at the coordinating server, in the user page cache table based on the UE identifier received in the paging message to identify the virtual base station instance and the last known location; and forwarding, from the coordinating server to the last known location of the UE, the paging message based on the queried last known location for the UE identifier received in the paging message, thereby making efficient use of radio resources and computing resources to page the UE.

The user equipment identifier may be an international mobile subscriber identity (IMSI). The user equipment identifier may be a serving temporary mobile subscriber identity (S-TMSI). The last known location may be a cell-id. The method may further comprise forwarding the paging message to the user equipment via the first radio access network based on the last known location. The coordinating server may be an evolved packet data gateway (ePDG) or trusted wireless access gateway (TWAG). The coordinating server may be a gateway between a plurality of radio access network nodes and a Long Term Evolution (LTE) packet data network gateway (PGW), and the coordinating server may be a gateway between the plurality of radio access network nodes and a serving global packet radio service support node (SGSN).

The method may further comprise receiving, at the coordinating server, an incoming paging request for a first radio access technology, and based on the queried last known location, preferentially sending a paging request to a multi-radio access technology base station supporting the first radio access technology. The method may further comprise receiving, at the coordinating server, an incoming paging request for a first radio access technology, and based on the queried last known location, preferentially sending a paging request to a multi-radio access technology base station supporting a second radio access technology. The method may further comprise querying, at the coordinating server, the neighbor relation table to determine neighbor cells of the last known location of the UE; and forwarding, from the coordinating server to the determined neighbor cells, the paging message together with the last known location of the UE. Forwarding of the paging message from the coordinating server to the determined neighbor cells may be a configurable option. The user page cache table is stored in a database.

Systems and methods for improved paging are described. In a second embodiment, a method may be disclosed, comprising: providing a combined user device location database in a heterogeneous radio access network at a coordinating gateway between a plurality of radio access network nodes and a plurality of core network nodes; at the coordinating gateway, storing a first location of a user device in the combined user device location database in association with a user device identifier and based on receiving a first user device registration request at a first radio access network; at the coordinating gateway, storing a second location of the user device in the combined user device location database in association with the user device identifier and based on receiving a second user device registration request at a second radio access network; and querying the combined user device location database for a last known location of the user device across both the first and the second radio access network, thereby maintaining a combined user device location database across multiple radio access technologies in a heterogeneous radio access network.

The user device may be a UE, and the user device identifier may be an international mobile subscriber identity (IMSI). The first and second radio access network provide access via different radio access technologies. The method may further comprise sending a paging request to the user device via the first radio access network based on the last known location. The method may further comprise receiving a paging request to the user device using a first radio access technology of the first radio access network. The method may further comprise recording an international mobile subscriber identity (IMSI) of the user device at the coordinating gateway from both the first and the second received user device registration requests. The coordinating gateway may be an evolved packet data gateway (ePDG) or trusted wireless access gateway (TWAG), and the method further comprises recording an international mobile subscriber identity (IMSI) of the user device upon IPsec security tunnel establishment for the user device at the coordinating gateway. The coordinating gateway may be an evolved packet data gateway (ePDG) or trusted wireless access gateway (TWAG), and the coordinating gateway may be a gateway between the plurality of radio access network nodes and a Long Term Evolution (LTE) packet data network gateway (PGW), and the coordinating gateway may be a gateway between the plurality of radio access network nodes and a serving global packet radio service support node (SGSN).

The method may further comprise receiving an incoming paging request for a first radio access technology, and based on the queried last known location, preferentially sending a paging request to a multi-radio access technology base station. The first location and the second location may be base station identifiers. The first location may be an identifier of the first radio access network and the second location may be an identifier of the second radio access network, and the first location and the second location may be E-UTRAN cell global identifiers (ECGIs). The method may further comprise storing position coordinates of the user device in the combined user device location database, retrieving the stored position coordinates of the user device as a result to a query to the combined user location database for the last known location of the user device, and sending paging messages to base stations in a geographical region based on the retrieved stored position coordinates.

In a third embodiment, a system for providing paging in a cellular telecommunications network may be disclosed, comprising: a first multi-radio access technology (multi-RAT) base station; a second multi-RAT base station in communication with the first multi-RAT base station; and a coordinating gateway in communication with the first and second multi-RAT base stations and situated between the first and second multi-RAT base stations and a core network, the coordinating gateway The method may further comprise: a combined user device location database, and a processing module configured to perform steps including: providing a combined user device location database in a heterogeneous radio access network at the coordinating gateway between the first and second multi-RAT base stations and a plurality of core network nodes; at the coordinating gateway, storing a first location of a user device based on receiving a first user device registration request at the first multi-RAT base station; at the coordinating gateway, storing a second location of the user device based on receiving a second user device registration request at the second multi-RAT base station; and querying the combined user device location database for a last known location of the user device across both the first and the second multi-RAT base stations, thereby maintaining a combined user device location database across multiple radio access technologies in a heterogeneous radio access network.

DETAILED DESCRIPTION

Figure 1:
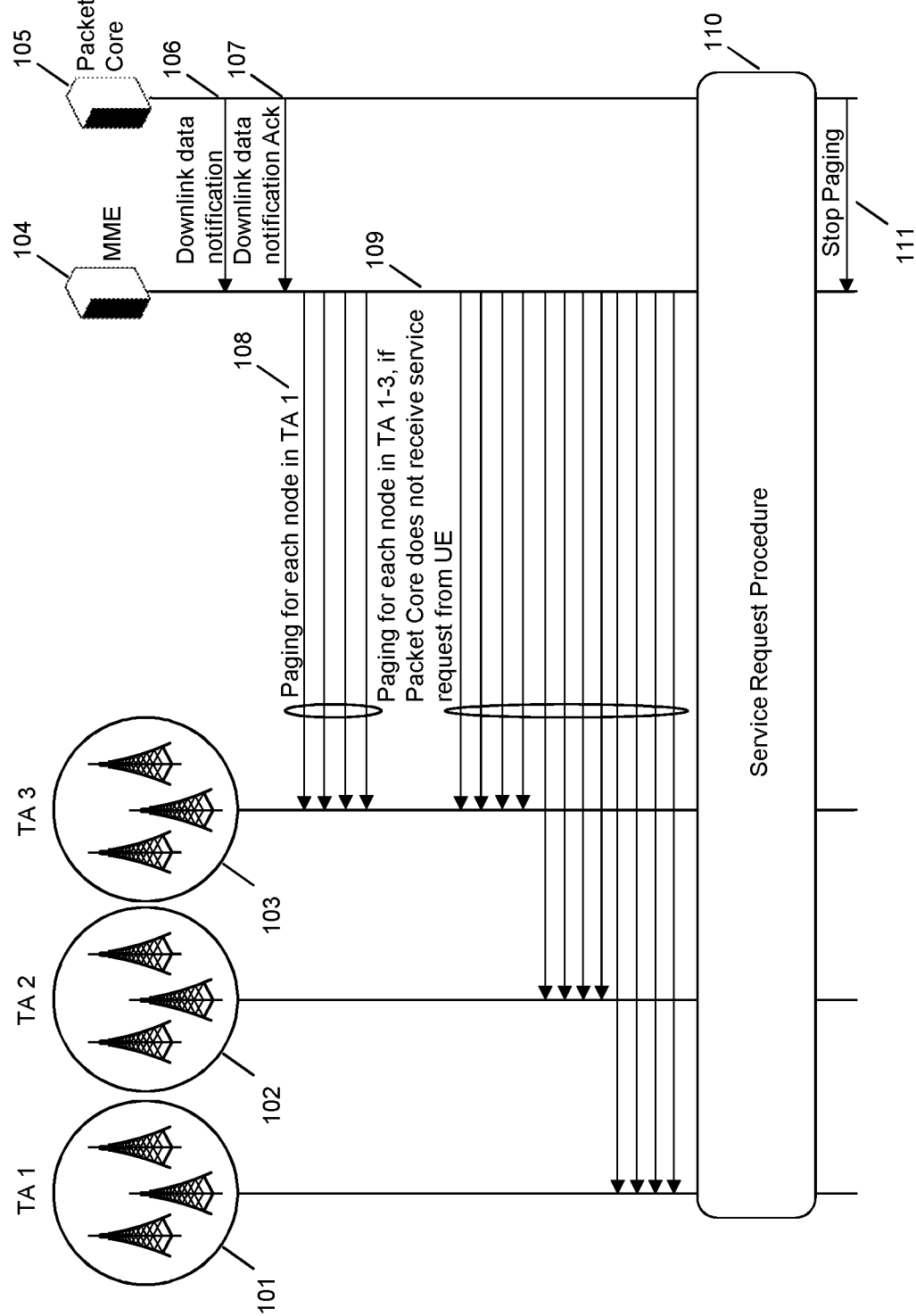
FIG. 1 is a call flow diagram of a typical paging procedure in the prior art.

In small cell technologies, consider the case where there are thousands of such Paging request messages and all of these need to be broadcasted. As many small-cells share the same CN-side LAC, RAC and TAC values, the Paging flooding would unnecessarily load the whole networks of small-cells.

Hence, there was a need of the optimization techniques for the paging. Such Paging messages could be optimized to be sent to a selective number of small-cells instead of flooding it over entire small-cells network.

Technologies for paging optimization exist, but very little material is available for the Paging Optimization across the multi-RAT heterogeneous network gateways.

Heterogeneous network (HetNet) gateways have a centralized entity for controlling multi-RAT access technologies. UE permanent identity information received from one RAT-technology can be stored along with multi-RAT cell-identifier, updated and mapped for other RAT-technologies. When there is an incoming Paging for one technology, based on the past UE-entry stored information, the Paging Request could be directed to the multi-RAT cell first. The position coordinates of the UE could be additionally stored in the mapping table, and the Paging message could be sent to the multi-RAT cells in that geographical region.

The tradeoff is that we have to maintain a centralized UE-database at HetNet gateway which could be queried and updated across multiple Access-technologies.

Parallel Wireless has a distinction of supporting 3G, LTE, Wi-Fi and SON on same box and thus, sharing the global information like UE-database across multi-access technologies and achieving Paging optimization. This solution may be generalized for any heterogeneous solution supporting 3G, LTE, Wi-Fi, etc.

The following describes the case of HetNet Gateway supporting the Wi-Fi (ePDG, TWAG), LTE and 3G technologies. A typical UE after finishing a 3G CS-Call/PS-Data or after doing the location-Update moves to Idle-Mode. Such Idle-UE may move to another coverage zone with the same Location/Routing-Area Code and hence, the exact location of UE will not be known to the Core-networks. Such UE when comes to a Wi-Fi Coverage shall create association with the Wi-Fi-Access Point and get connected to Internet via Wi-Fi. Hence, Core-network entities like MSC, SGSN or even MME may not be aware of the exact location of that UE. If there is any incoming 3G CS-Paging for such UE at HNBGW, then the Paging message shall be broadcasted to many Small-cells registered with the same Location-Area-code. Even there is a possibility that such LTE PS-Paging shall be broadcasted on tracking area level.

When a UE establishes IPSEC connection using IKE-v2 with Wi-Fi-Gateway like ePDG, during IKE-v2 Auth phase, UE publishes its IMSI or TMSI in the UE-Id field. The HetNet Gateway (HNG) may update this UE information like IMSI in its database. Such entry may store the CWS-information, UE-Ids like IMSI, and TMSI per Entry.

When HNG receives any CS or PS-Paging from MSC or SGSN for an incoming CS or PS-call respectively, it may refer the update IMSI-database and page the UE to the zone where the UE is attached with Wi-Fi. With this approach, Paging Optimization could be achieved at HNG by Paging the Zone where the UE was last seen. Please refer the figure for more details.

Similarly, in case of LTE and 3G Multi-RAT system, the UE-Permanent Identity information received from LTE can be used for selectively paging the UE during CS-Paging from the MSC if there is no CS-FB feature support at the EPC.

In 4G, subscriber's IMSI is not always known. But in 3G subscriber's IMSI is always known. We can use 3G's paging cache to forward 4G's IMSI based paging messages. When the core network pages the UE, it requires the UE to respond in respective RAT. At coordinating gateway or coordinating server (i.e. HNG), we can use the multi-RAT UE database to narrow down the paging to one or more CWS where the UE was last seen. This helps reduce the paging load on the overall network and makes the procedure more efficient. As well, in some embodiments, the present disclosure combines LTE paging, circuit-switched connection paging, Wi-Fi paging (with ePDG or TWAG), and 3G paging into a single cohesive solution.

We want to make use of CWS-identity which is common for 3G, 4G and Wi-Fi and thus, when the UE attaches via one RAT, we know the IMSI, other UE-identifiers and CWS-identity and store in our combined database. Without this feature/idea, the UE would need to be paged in multiple cells belonging to one or multiple location/tracking areas. According to the disclosed systems and methods, a single RAT for the UE can be identified with high confidence, even across multiple RATs.

When there is Paging from other RAT technology with same IMSI, or other UE-identifiers, we will do the query in the Data-base to identify the last known CWS-identity for that UE and thus, the Location information. The UE-database was created from 1 Radio-Technology but is used for doing Paging optimization for other Radio-Technology. Now, we will forward Paging Request to that CWS. UE permanent identity information received from one RAT-technology can be stored along with multi-RAT cell-identifier, updated and mapped for other RAT-technologies.

The coordinating server virtualizes all the cells connected on an access side and presents itself as a large macro eNodeB towards a mobile operator's core network. This method of virtualization may be made possible by assigning a twenty bit macro eNodeB Id, that is advertised towards the core network, and each cell or base station that may connect to the coordinating server may be assigned a twenty-eight bit E-UTRAN Cell Identifier (ECI). ECI assigned to each cell or base station may have most significant twenty bits same as macro eNodeB Id assigned to the coordinating server. In essence, each cell on the radio access network side may be like a sector of a large macro. Because, ECI is total twenty-eight bit and macro eNodeB Id is twenty bits, there may be a total two hundred fifty five (255) cells, that may be represented by the coordinating server as a large macro eNodeB to the core network. A coordinating server therefore may appear as one large macro eNodeB, referred in this disclosure as a virtual eNodeB (VeNB), virtualizing 255 or more different base stations to the core network using a single identifier, such as a CellID. In other words, each VeNB instance at the coordinating server may represent and may manage base stations of 2G, 3G, 4G, 5G, Wi-Fi, or WiMax etc. radio access technology. The VeNBs are called VeNBs for convenience, but may refer to base stations of any RAT. The VeNBs may represent themselves to the 4G core network as eNodeBs, while simultaneously being represented to another core network as the BS supporting the particular RAT of that core network.

In accordance with some embodiments, the coordinating server while acting as VeNB dynamically provisions each base station connecting to the coordinating server. As such, each base station may not be permanently connected to one coordinating server, but may connect to different coordinating server. This may be true specifically for in-vehicle eNodeB. It has been assumed here that E-UTRAN Cell Global Identifier (ECGI) of a base station may change as the base station loses connectivity and reconnect to the coordinating server. For dynamic provision of the base stations via self-organizing network (SON) module, the coordinating server may be configured with at least one zone and one VeNB ID. Please note that, the coordinating server may be assigned a multiple of VeNB ID, each VeNB ID is an instance of VeNB. Each zone may have a list of public land mobile network identifier (PLMN ID), a list of track area code (TAC), a list of emergency area identifier (EAID). Here, VeNB instance is associated with a zone, and zone to VeNB instance relationship is one to many. VeNB instance here may be an eNodeB ID.

When a base station discovers a coordinating server, the base station sends a configuration request to the coordinating server. The configuration request from the base station to the coordinating server may contain a unique base station ID, an IP address for the coordinating server to connect to and capabilities of the base station hardware (inventory info). The coordinating server in accordance with configured policies may then perform allocation of dynamic and static configuration parameters. The coordinating server assigns VeNB instance to the base station, thereby assigning PLMN, eNodeB Id, TAC, EAID to the cell. As mentioned, zone to VeNB relationship is one to many, there may be two cells, or two base stations assigned same value for PLMN, TAC, EAID.

In accordance with some embodiments, an example of a coordinating server and multiple base station configuration is described here. The coordinating server has two virtual eNodeB ID instances VeNB1 and VeNB2 as venb20089 and venb20090 respectively. There may be one zone, e.g., venbzone named public-safety. The public-safety zone may further have emergency area id as 123, public land mobile communication network identifier as 00132 and a list of tracking area codes 2311, 2313, 3412, and 4356. The public-safety zone is associated with the VeNB1 and VeNB2 instances. The base station BS1 when connects to the coordinating server, the base station BS1 may have a VeNB1 instance with PLMN Id as 0x00132, eNodeB ID as 0x20089, and Cell ID 0x00. Another base station BS2 may have a VeNB2 instance with PLMN Id as 0x00132, eNodeB ID as 0x20090, and Cell ID 0x00. The coordinating server appears to the core network using one ECGI, or a macro eNodeB ID, the macro eNodeB ID is mapped to a plurality of base stations having a unique ECGI, that is a combination of PLMN Id, eNodeB ID, and Cell ID.

Therefore, at the coordinating server, there may be up to 32 VeNB instances in each connection to the EPC (EPC-CONN). Further, as described above, each VeNB instance can be connected to 255 (or an arbitrary number of) single or multi-radio access technology (multi-RAT) base stations or third party eNodeBs. Each base station may support radio access technologies like 2G, 3G, 4G, 5G, Wi-Fi, WiMax, etc, or any combination thereof. A multi-RAT base station may be represented to the virtual base station as a single RAT. In some embodiments, the coordinating server may be connected to a plurality of Any-G core network. The coordinating server may have a plurality of VeNB instances, each VeNB instance may have up to 255 Any-G base stations. Further, the plurality of VeNB instance may be the plurality of virtual Any-G base station instance. Here, Any-G may represent radio access technology, e.g., 2G, 3G, 4G, 5G, Wi-Fi, or WiMax, etc.

The user equipment identifier used in the user page cache table may be different based on the radio access technology of the virtual base station instance. For example, S-TMSI may be used as user equipment identifier for 4G LTE based virtual base station instance, or IMEI/IMSI may be used for 2G/3G based virtual base station instance. When the user equipment latches to the base station to access core network services, the user equipment sends its IMSI/IMEI information in the initial connection request message. The base station communicates to the core network through the coordinating server acting as a gateway or proxy between the radio access network and the core network. Therefore, the connection request message with IMSI and the connection response message with S-TMSI as allocated by the MME in the core network flow through the coordinating server. The coordinating server may maintain a table of mappings from one UE identifier to another identifier, e.g., S-TMSI to IMSI/IMEI, at the EPCCONN level and may be used to find the user equipment identifier based on the identifier that is available for any particular radio access technology. This mapping may be used to perform paging for more than one RAT if necessary. For example, if paging occurs originated from a 3G RAT, the mapping may be used to identify when the UE is appropriately located at the 4G RAT, and to initiate paging at the 4G RAT.

In some embodiments, the coordinating server may be connected to a plurality of core networks, which may be of heterogeneous RATs. The coordinating server may further have a heterogeneous radio access network. The coordinating server may have a plurality of heterogeneous VeNB instance. The heterogenous VeNB instance may manage a mix of Any-G base stations. Here again. where Any-G may represent radio access technology, e.g., 2G, 3G, 4G, 5G, Wi-Fi, or WiMax, etc. The coordinating server receiving paging request for a given tracking area code/tracking area identity and a given user equipment identifier from the Any-G core network, may search its user page cache table, the user page cache table stored at the EPCCONN level instead of at each VeNB instance. The coordinating server upon successful lookup of the user identifier in the user page cache table, may forward the paging request to the last known cell identified for the user equipment identifier and its neighboring cells in the VeNB instance. The last known cell may be served by a base station of a radio access technology similar to Any-G VeNB instance or it may be of different radio access technology for heterogenous VeNB instance.

Every VeNB instance maintains a table of Serving Temporary Mobile Subscriber Identity's (S-TMSI's) last known ECGI (cell-id). S-TMSI serves as a user equipment identifier, and other form of user equipment identifier may also be used in place of S-TMSI. When a paging message is received from an MME, the coordinating server may forward the paging message to the last known ECGI and wait for a preconfigured stage 1 timer to expire. If no response is received before the stage 1 timer expires, then the paging message is forwarded to all cell-ids of the VeNB instance having a matching tracking area code (TAC). This may also result in multiple VeNB instance receiving the paging message, and each VeNB instance may therefore be required to search its page cache table for the given S-TMSI and forward the paging message to the last known cell-id found in the page cache table, or otherwise move to stage 2 and broadcast the paging message to all the multi-RAT base stations in the VeNB instance. This may result in an inefficient use of the radio and computing resource at each VeNB instance, since the page cache table is stored separately for every VeNB instance, and each VeNB instance allot computing cycles to search page cache table while only one of the VeNB instance may know the last known cell-id for the UE.

In accordance with some embodiments, a UE page cache table is maintained at the coordinating server instead of per VeNB instance. If VeNB instances have the same virtual network, then they may share this information as well. This may result in the reduced number of paging messages. While there is no limit in the number of entries in page cache table, the page cache table may be updated as inter and/or intra VeNB handover occurs. The page cache table maintained per EPCCONN is common for all the VeNB instances for the EPCCONN. The page cache table may include the last known cell-id for the given S-TMSI and the associated VeNB instance.

When the MME sends a paging message to the VeNB for a S-TMSI, the S-TMSI will be searched in the page cache table. If no matching record found in the page cache table for the given S-TMSI, then the paging message will be send to all the cell-id under the VeNB instance(s) that matched the tracking area code (TAC)/tracking area identifier (TAI). If a matching record found in the page cache table for the given S-TMSI, stage 1 timer may be started and paging message may be forwarded to the VeNB instance according to the information present in the page cache entry irrespective of the VeNB instance paged by the MME. If no response is received prior to expiry of the stage 1 timer, a stage 2 timer may be started, and the paging message may be forwarded to all of the VeNB instances that received the paging message from the MME, so that the paging message may be forwarded to each multi-RAT base station having a matching TAC/TAI. Once stage 1 timer is started, any paging message for the given S-TMSI if received at the other VeNB instance may be discarded. If the stage 2 timer also expires that the page cache entry for the given S-TMSI may be deleted from the page cache table.

In accordance with some embodiments, at stage 1, instead of forwarding the paging message to only the last known cell, paging message may be forwarded to the neighboring cells of the last known cell to improve chances of reaching to the UE successfully. Self-organizing network (SON) may provide neighboring cell information for every cell. The operator may provision as a configuration parameter whether to page neighboring cells during the stage 1. The operator may also specify as a configuration parameter number of neighboring cells to be paged at stage 1 in addition to the last known cell-id for the given S-TMSI. The neighboring cells may be managed by the same coordinating server. The operator may also specify as a configurable option whether to include the cell paged at stage 1 during stage 2 paging operation.

In accordance with some embodiments, if the MME retransmits the paging message before stage 1 timer expires, the coordinating server may disarm the stage 1 timer and may immediately move to stage 2 to broadcast the paging message to all the multi-RAT base stations having a matching TAC/TAI. During the retransmission of the paging message by the MME, even if the operator has specified through configuration option to exclude cell to which the paging message was forwarded at stage 1, all the cells are paged and thus the configurable option may be ignored.

In accordance with some embodiments, the page cache table may be maintained in a distributed database so that the paging operation may be optimized across multiple coordinating servers. For example, in a multi-operator core network (MOCN) situation, multiple core networks may require multiple distributed databases to be maintained, whether at a single centralized node or across multiple nodes. Since the user page cache table is maintained at the EPC connection (EPCCONN) level, distributed database for each EPCCONN for the associated MOCN provides security and better operational speed. It further simplifies provisioning for each MOCN. Storing of the user page cache table in a distributed database also offers benefit where the coordinating node is installed on a plurality of virtual machines at a cloud data center. In addition, the contemplated idea of storing user page cache table in a distributed database provides support to a fault-tolerant, redundant architecture that may require a single database to be replicated across multiple nodes. Various different open source or proprietary distributed database systems, e.g., Apache Cassandra, MongoDB, Oracle MySQL, PostgreSQL, IBM Db2, etc., may be used to store the user page cache table at the coordinating server for each EPCCONN, where each EPCCONN may have up to thirty-two VeNB instances, each VeNB instance managing up to two-hundred-fifty-five different base stations of single or multiple radio access technologies.

In accordance with some embodiments, the stage 1 timer value may be dynamically adapted based on mean response time from the base station, based on statistical data collected over time, instead of operator configured value. The neighboring cells to page along with the last known cell-id for the given S-TMSI may be selected based on historical hand-in and hand-out statistics.

In accordance with some embodiments, EPCCONN instance at the coordinating server may maintain the S-TMSI's or other user equipment (UE) identifier's last known cell-id and its corresponding VeNB instance information. VeNB instance may not maintain the last known cell-id information for any S-TMSI or other UE identifier. When MME may send paging message for a VeNB instance, e.g., VeNB1, but the search of paging cache informs that the last known cell-id for the UE identifier identified in the paging message is at a VeNB instance, e.g., VeNB2, the coordinating server may forward the paging message to the VeNB instance VeNB2. During stage 1 when the stage 1 time is running, the coordinating server may send paging information to the last known cell-id as found in the user page cache table at the EPCCONN and its neighboring cells.

In some embodiments, while stage 1 timer is running, any paging message received for the same T-TMSI or UE identifier for other VeNB instances in the same EPCCONN may be discarded. The coordinating server may stop the timer it has started at stage 1 or stage 2 upon receipt of a paging response. The paging response may be received either at stage 1 or at stage 2 paging request processing. After the expiry of stage 1 timer, if no paging response is received, the coordinating server may forward the paging message with stage 2 information to all the VeNB instances which received paging message in stage 1 in that EPCCONN. VeNB instance may forward paging message to all the base stations that matches the tracking area code/tracking area identity during stage 2 while stage 2 timer is running. Whether to forward or not forward the paging message to all the base stations to which the paging message was forwarded during stage 1 may be provisioned by the operator as a configurable option. Further, the configurable option may be configurable based on each MME pool.

In some embodiments, self-organizing network (SON) at the base station may send the neighboring cell information of the base station to the URANCONN at the coordinating server whenever the base station is powered up. Further, if the neighboring cell or neighboring base station information changes, the SON may update the URANCONN at the coordinating server. Values for paging cache timeout, paging stage 1 timeout, and paging stage 2 timeout may be provided as a configurable option, and may be configurable based on each MME pool. Further, whether to send paging message to the neighboring base stations during stage 1 may be a configurable option based on each MME pool. During stage 1, the paging message may be sent to the neighboring base stations belonging to a different VeNB instance or a different EPCCONN at the same coordinating server if the tracking area code/tracking area identity information matches. If stage 2 timer expires without receipt of a paging response then the page cache entry of that S-TMSI or UE identifier may be removed from the page cache table.

The protocols described herein have largely been adopted by the 3GPP as a standard for the upcoming 5G network technology as well, in particular for interfacing with 4G/LTE technology. Additionally, the 5G standard includes two phases, non-standalone (which will coexist with 4G devices and networks) and standalone, and also includes specifications for dual connectivity of UEs to both LTE and NR ("New Radio") 5G radio access networks. The multi-RAT base station in this disclosure may support 2G, 3G, 4G, 5G, WiMax, Wi-Fi, etc. radio technologies to allow the UE to connect to the multi-RAT base station to access the core network service(s). As described herein, the user page cache table is maintained at the coordinating server at the EPCCONN level instead each VeNB instance maintaining its own user page cache table. Each VeNB instance may support up-to 255 different cells of single or multi-RAT base stations and providing user a radio access over 2G, 3G, 4G, 5G, Wi-Fi, WiMax, etc. radio access technology. Thus, methods for paging optimization described in this disclosure are relevant to a radio access network comprising base stations of 2G, 3G, 4G, 5G, Wi-Fi, WiMax, etc. radio access technologies.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases, Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony.

In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. Features and characteristics of and pertaining to the systems and methods described in the present disclosure, including details of the multi-RAT nodes and the gateway described herein, are provided in the documents incorporated by reference.

FIG. 1 is a call flow diagram of a typical paging procedure in the prior art. Tracking area 1 is composed of multiple eNodeBs, as shown in the diagram at 101. As well, tracking areas 1 and 1 are composed of multiple eNodeBs at 102 and 103. At 104, a mobility management entity (MME) is shown. The MME is part of an operator core network, and is responsible for managing mobility and for performing paging of a UE when it is inactive, and data is received for it at a serving gateway (SGW; not shown) in the core network. At 105, a packet core is shown. Packet core 105 represents the SGW, as well as other nodes in the core network, such as a packet gateway (PGW). Packet core 105 may be an evolved packet core (EPC).

At step 106, a downlink data notification is sent from the packet core 105 to MME 104. MME 104 acknowledges receipt of the downlink data notification at step 107. At this time, the MME must now find the UE via paging eNodeBs until the UE is found.

At step 108, the MME initiates paging. According to the LTE standard, the network keeps track of all UEs at a tracking area level, in order to facilitate paging. Therefore, the MME has information about the last known tracking area of the UE, which is TA 1 101. MME 104 thus pages the UE at TA 1. However, in the example illustrated, the UE is no longer nearby any of the base stations in TA 1.

At step 109, since the UE was not found in TA 1, MME 104 commences paging at TAs 1, 1, and 1. Multiple paging messages are sent out. The paging messages are very expensive from a network point of view, as these messages require each base station to send out a paging message and listen for responses, and as they require a great deal of signaling to be coordinated between the MME and every eNodeB in each affected tracking area. Paging messages are also expensive because, until they are stopped, they require the affected eNodeBs to repeatedly perform the paging procedure until the UE is found. Paging messages also require all UEs connected on the network to wake up to check to see whether it has been paged, draining UE battery.

At step 110, once the UE being paged receives the paging message and wakes up, the UE (not shown) responds by attaching to an eNodeB or otherwise sending a service request, and this service request is transmitted via the eNodeB up to the MME 104 and packet core 105. At step 111, the packet core connects the UE to network services, delivers the waiting data, and also causes paging to be stopped at all eNodeBs, at last ending the signaling load on the network.

Figure 2:
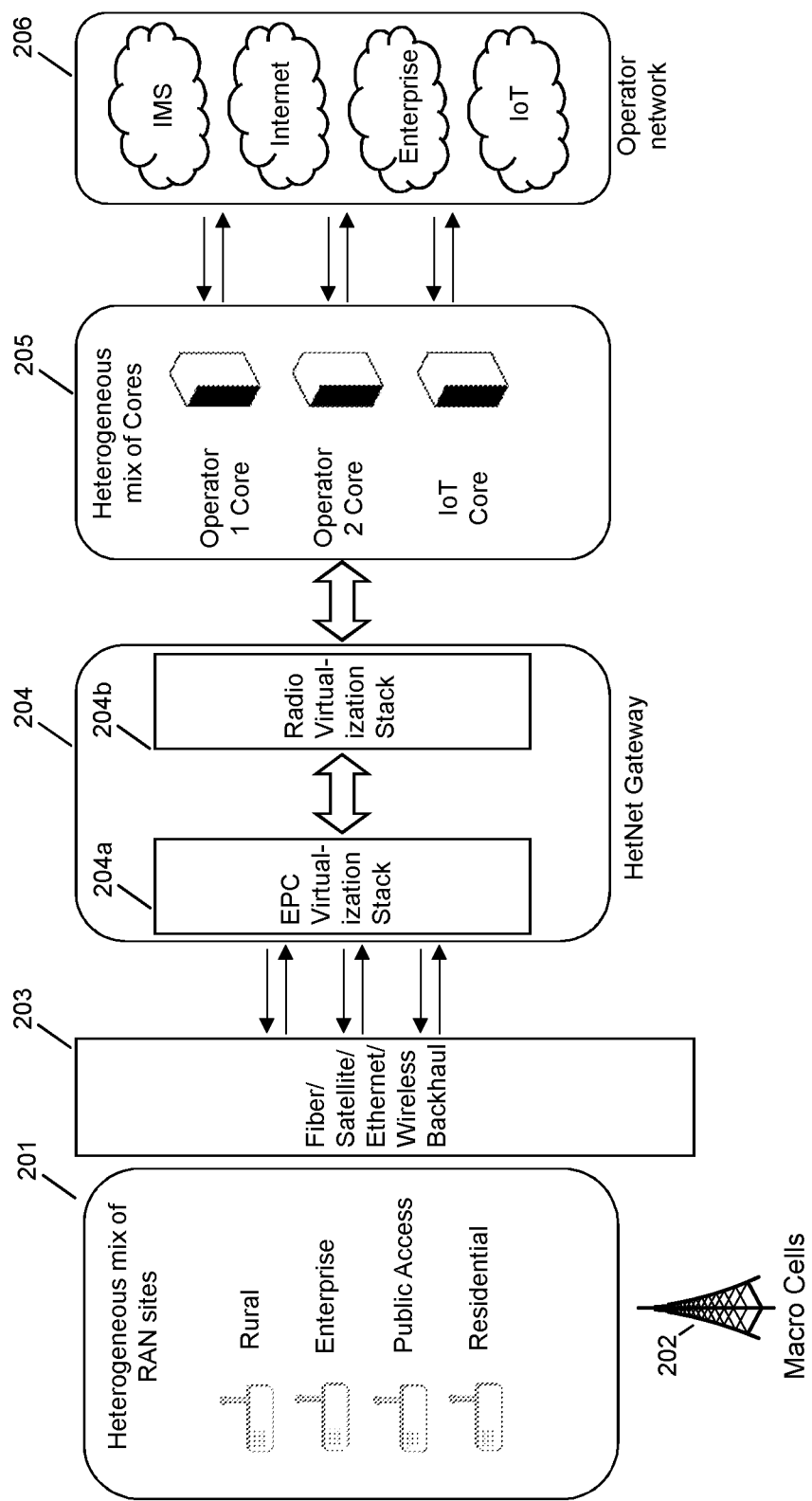
FIG. 2 is a schematic diagram of a deployment architecture for a wireless network, in accordance with some embodiments.
Figure 3:
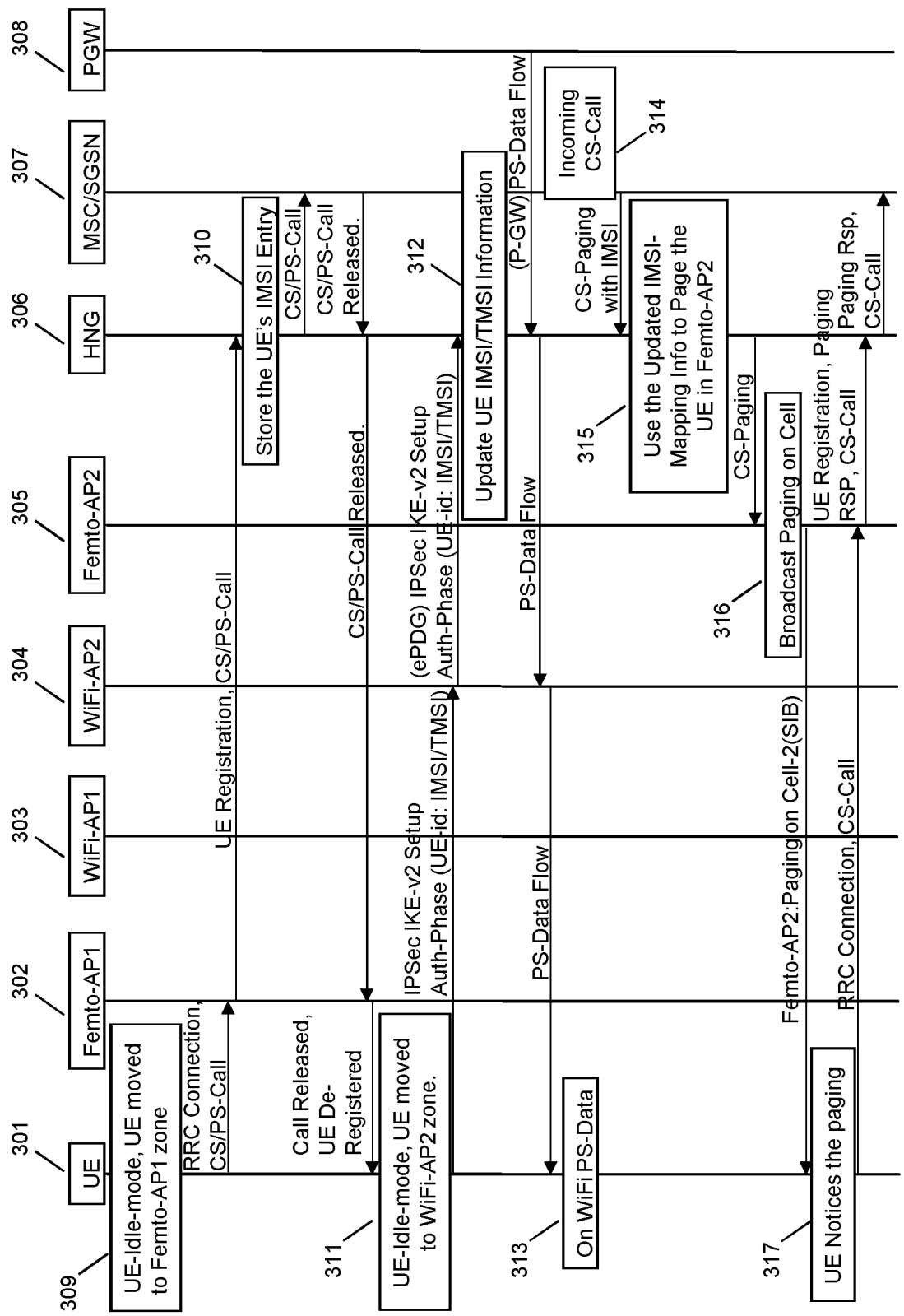
FIG. 3 is an exemplary call flow diagram showing improved paging.

FIGS. 2 and 3 which follow provide more information about the context of paging in the above system. The base stations described below may be multi-RAT base stations and may permit access or backhaul using a variety of combinations of radio access technologies.

FIG. 2 is a schematic diagram of a deployment architecture for a wireless network, in accordance with some embodiments. Box 201 includes a plurality of heterogeneous radio access networks (RANs) using different radio access technologies and located in different environments. Rural, enterprise, public access, and residential radio access nodes are shown, but additional heterogeneous network access nodes may be contemplated as well, such as base stations used in a military context, small cell/micro-cell/pico-cell/femto-cell deployments, and other deployments. This heterogeneous mix of RANs is shown in conjunction with one or more macro cells 202. Each of the heterogeneous RANs and the macro cells are managed by coordinating gateway 204, as explained further below.

Backhaul for the heterogeneous RAN sites and macro cells may also be provided, as shown at box 203. The backhaul connections may also be diverse and widely varied. For example, high-throughput, low-latency fiber, high-latency satellite, Ethernet, wireless backhaul such as microwave or non-line of sight, or other backhaul connections may be used, sometimes in conjunction with each other.

Box 204 shows a coordinating node, also identified here as a heterogeneous network gateway, coordinating server, or hetnet gateway. Coordinating node 204 is located in the cloud and may be at a remote site, but is located between the RAN and the core network and is in communication with both RAN 201, 202 and core network(s) 205. Coordinating node 204 sends and receives all data to and from RANs 201 and 202, and may be considered a gateway between the RAN and the core network. Coordinating node 204 includes evolved packet core (EPC) virtualization stack 204a in communication with radio virtualization stack 204b. Both virtualization stacks 204a, 204b provide back-to-back user agent (B2BUA), proxy, and translation services, as described below.

EPC virtualization stack 204a serves as a core network proxy for communications between the RAN and the core network. Details regarding the core networks may be abstracted, translated, interworked, or otherwise changed, effectively virtualizing the core network to appear as a single, simplified core network to the RAN.

Radio virtualization stack 204b serves as a RAN proxy for communications to/from the core network to/from the RAN.

Similar to the operation of 204a, details regarding the RAN sites may be abstracted, translated, interworked, or otherwise changed, and complexity is hidden from the core network by proxying and translating all communications from the core network. This may include masking all base station physical cell identities, tracking area codes, and other base station identifying information. From the core networks point of view, all of the RAN sites 201, 202 appear as a single base station or eNodeB. All handovers within the domain of the coordinating node are performed by the gateway, in some cases using an internal EPC functionality, and not exposed to the core network. The core network sees UE attach/detach and other service requests, but is freed from having to manage the eNodeBs themselves. According to the LTE standard, in addition to handover signaling, to prevent data loss during handover, indirect data tunnels are created by MME with source eNodeB, target eNodeB and at SGW. The coordinating node may also take care of indirect data tunneling as well, thus reducing the signaling between MME and SGW during handover.

Box 205 shows a heterogeneous mix of cores, as enabled to be used in conjunction with coordinating node 204. The heterogeneous mix of cores may include one core, two cores, or more cores. The heterogeneous mix of cores may include a dedicated core for Internet of Things (IoT) applications, or for any other applications. The heterogeneous mix of cores may include a plurality of cores managed by different administrative agencies or companies, or multiple cores managed by the same company. Although a single set of RAN nodes is not typically able to be shared among multiple cores, the use of EPC virtualization stack 204a, as described above, permits the details of the core network to be abstracted or virtualized.

Core network(s) 205 are in communication with coordinating node 204 and also with operator networks 206, for example, via a packet gateway (PGW) to the public Internet.

Box 206 shows a number of networks, public and private, that may be connected to the one or more core networks 205, including an IP Multimedia Subsystem (IMS) network for providing mobile subscriber authentication and Voice over LTE (VoLTE) functionality, the public Internet, an enterprise private network, or an Internet of Things (IoT) network.

FIG. 3 is an exemplary call flow diagram showing improved paging. UE 301 is in communication with a network. In the network are radio access network nodes as follows: first femto access point 302, first Wi-Fi access point 303, second Wi-Fi access point 304, second femto access point 305. In the present disclosure, access point is understood to mean either access point or base station, or both, except where context makes its meaning unambiguous. Further towards the core network are a coordination server 306 (here identified as HNG, short for the Parallel Wireless HetNet Gateway [TM]), a mobile switching center (MSC) or serving GPRS support node (SGSN) 307, and a packet data network gateway (PGW).

At step 309, the UE is in idle mode and is physically in the zone of Femto-AP1. The UE makes an RRC connection to Femto AP1 to complete a call, which registers with the PGW via the HNG. The HNG stores the UE's IMSI at step 310. When the call terminates, the UE is de-registered.

At step 311, the UE moves to the physical coverage area of Wi-Fi AP 2. As Wi-Fi AP 2 is not a base station in the network, the AP sets up an IPsec tunnel to the HNG, which is acting as an ePDG to permit access to the core network. At this point, the HNG updates the UE IMSI/TMSI information, at step 312. The HNG is aware that Wi-Fi AP 2 and Femto AP 2 are the same zone. This is based on the understanding that Wi-Fi AP2 and Femto AP 2 are actually the same multi-RAT device, in some embodiments. This understanding of which multi-RAT base stations are capable of which RAT is based on an association at the HNG of each separate base station identifier (e.g., Wi-Fi AP 2 304 and Femto AP 2 305) with each others' cell identifiers, such as via ECGI. It is helpful to note that identifiers are RAT-specific, and thus by associating these RAT identifiers, the base station may be understood by the HNG 306 to have multiple RAT capabilities. In some embodiments, all RATs of a base station can be associated with one identifier. In some embodiments, all RAT identifiers of a base station may be associated with all other identifiers of that base station.

Following step 312, a data flow initiated by the P-GW causes data to be sent through the network to the UE. At step 313, the UE has camped on the Wi-Fi network of Wi-Fi AP 2 and this has been updated at step 312 in the location database at HNG 306.

Next, an incoming circuit-switched call is received at the core network, at step 314. The call is attempted to be completed by the 3G core network (here shown as MSC/SGSN 307). The 3G core node 307 sends a paging message with the UE's IMSI to the HNG 306, which performs a lookup based on the IMSI into a location database.

The location database may be any database known to one having skill in the art. The database may contain the UE's last known position, listed as a cell identifier such as an ECGI, or listed as geographic coordinates. The database may contain multiple UE identifiers, not limited just to IMSI but also extending to other UE identifiers as described herein. The database may be queried based on any of these identifiers to retrieve one or more of the associated locations of the UE.

At step 315, the location is searched and retrieved at the coordinating gateway. The updated IMSI mapping info is used to page the UE in femto AP 2. At step 316, broadcast paging occurs on the cell of femto AP 2 (305). This allows the base station to directly page the UE, at step 317, causing the UE to initiate an RRC connection and enabling the core network to complete the call.

Figure 3A:
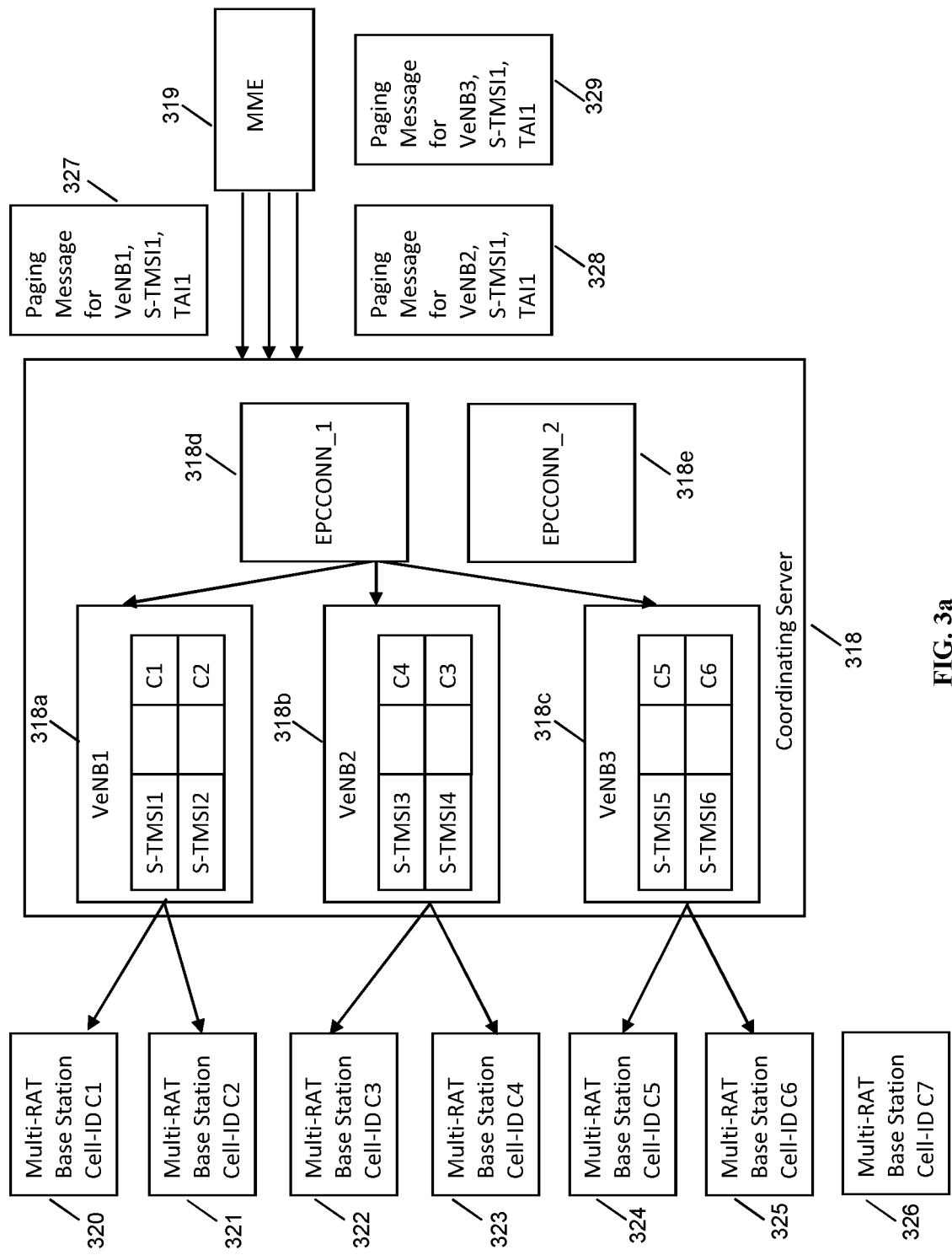
FIG. 3a is a block diagram of paging mechanism, in accordance with some embodiments.

FIG. 3a is a block diagram of paging mechanism in accordance with some embodiments. As shown in the figure, a coordinating server 318 is between a radio access network and a core network. The radio access network may include multi-RAT base stations 320 through 326 for cell id C1 through C7. An MME 319 in the core network sends paging messages 327, 328, 329 for S-TMSI S-TMSI1 and tracking area identity TAD for VeNB instances VeNB1, VeNB2, and VeNB3 respectively to the coordinating server 318. The coordinating server 318 may have EPCCONN EPCCONN_1_318d and EPCCONN_2_318e. The ECPCONN_1_318d may have VeNB instances VeNB1 318a, VeNB2 318b, and VeNB3 318c. Each VeNB instance may have a page cache table that associates S-TMSI to the last known cell id. When the paging messages 327, 328, 329 are received at the coordinating server, all VeNB instances 318a, 318b, and 318c may search their page cache table for the S-TMSI to find the last known cell id for the S-TMSI. However, only one VeNB instance 318a may be successfully able to find the last known cell id for S-TMSI1 in its page cache table and may forward the paging message to cell-id C1 320. Other VeNB instances 318b and 318c may forward the paging message to all the cells associated with the VeNB instance.

As described above in accordance with some embodiments, the EPCCONN_1_318d may be connected to a first mobile operator's Any-G core network (not shown in the figure) and the EPCCONN_2 may be connected to a second mobile operator's Any-G core network (not shown in the figure). Here, for example, the first mobile operator's Any-G core network may be related to 2G radio access technology and the second mobile operator's Any-G core network may be related to 5G radio access technology. Though, only two mobile operator's Any-G core networks are described here with reference to 2G and 5G radio access technology for simplicity, a person skilled in the art know the mobile operator's core network may support any radio access technology, e.g., 2G, 3G, 4G, 5G, Wi-Fi, or WiMax, etc. Similarly, each VeNB instances 318a, 318b, 318c may also represent Any-G virtual eNodeB instance. Though, the term virtual eNodeB instance (VeNB) is used throughout the disclosure and in the title of this patent application, inventors have contemplated that 318a, 318b, 318c may represent Virtual Base Station instance and may therefore be VgNB instance for 5G radio access technology, or VNB instance for 2G/3G, or VeNB instance for 4G, and likewise. Each virtual base station instance may be managing a plurality of base stations of the radio access technology presented by the virtual base station instance. Therefore, base stations 320 through 326 may either be a 2G base station, 3G NodeB, 4G eNodeB, 5G gNodeB, or a Wi-Fi access point, etc.

Figure 3B:
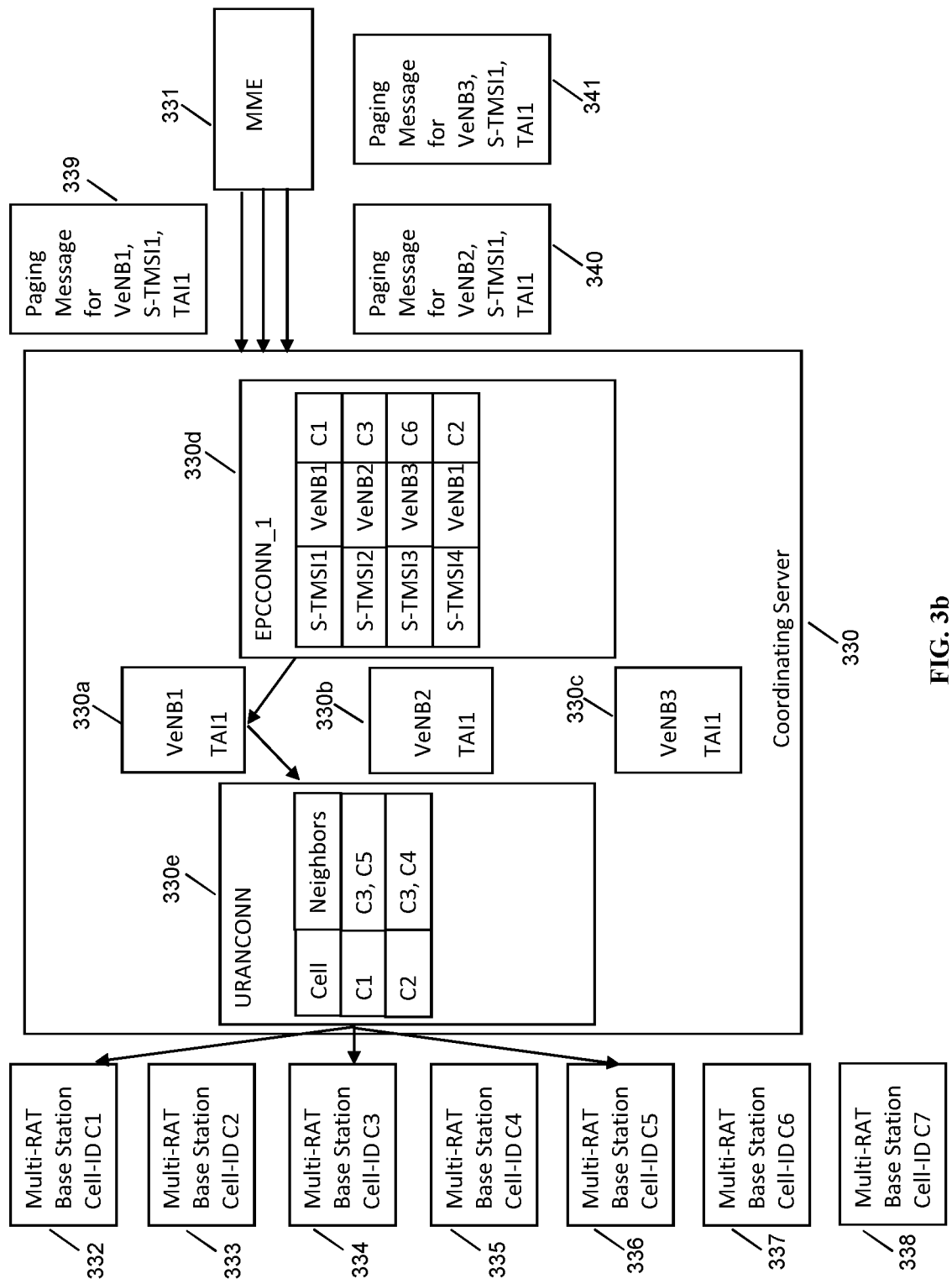
FIG. 3b is a block diagram of paging optimization in accordance with some embodiments.

FIG. 3b is a block diagram of paging optimization in accordance with some embodiments. As shown in the figure, a coordinating server 330 is between a radio access network and a core network. The radio access network may include multi-RAT base stations 332 through 338 for cell id C1 through C7. An MME 331 in the core network sends paging messages 339, 340, 341 for S-TMSI S-TMSI1 and tracking area identity TAD for VeNB instances VeNB1, VeNB2, and VeNB3 respectively to the coordinating server 330. The coordinating server 330 may have EPCCONN EPCCONN_1_330d. The ECPCONN_1_330d may have a page cache table that associates S-TMSI to the last known cell id and the VeNB instance for that cell id. When the paging messages 327, 328, 329 are received at the coordinating server, the page cache table is searched for the S-TMSI to find the last known cell id for the S-TMSI. The page cache table search for the S-TMSI may also return the associated VeNB instance. There may be VeNB instances VeNB1 330a, VeNB2 330b, and VeNB3 330c. Further, at the coordinating server, a table may be maintained for neighbor cells for each cell id. This table may be built using self-organizing network (SON) functionality and based on the reports from user equipments (UEs) received directly from the UEs or via the multi-RAT base stations to which the UEs are attached. Since the paging message is for S-TMSI1 for cell id C1, the paging may be forwarded to cell id C1 alone or in some embodiments to C1 and its neighbor cells C3 and C5.

As described above in accordance with some embodiments, the EPCCONN_1_318d may be connected to a first mobile operator's Any-G core network (not shown in the figure) and the EPCCONN_2 may be connected to a second mobile operator's Any-G core network (not shown in the figure). Here, for example, the first mobile operator's Any-G core network may be related to 2G radio access technology and the second mobile operator's Any-G core network may be related to 5G radio access technology. Though, only two mobile operator's Any-G core networks are described here with reference to 2G and 5G radio access technology for simplicity, a person skilled in the art know the mobile operator's core network may support any radio access technology, e.g., 2G, 3G, 4G, 5G, Wi-Fi, or WiMax, etc. Similarly, each VeNB instances 318a, 318b, 318c may be a heterogeneous virtual eNodeB instance. Further, each heterogeneous virtual eNodeB instance may manage either single RAT or multi-RAT base station. Further, the heterogeneous virtual eNodeB instance may manage base stations of different radio access technologies, e.g., 2G, 3G, 4G, 5G, Wi-Fi, WiMax, etc.

Figure 4:
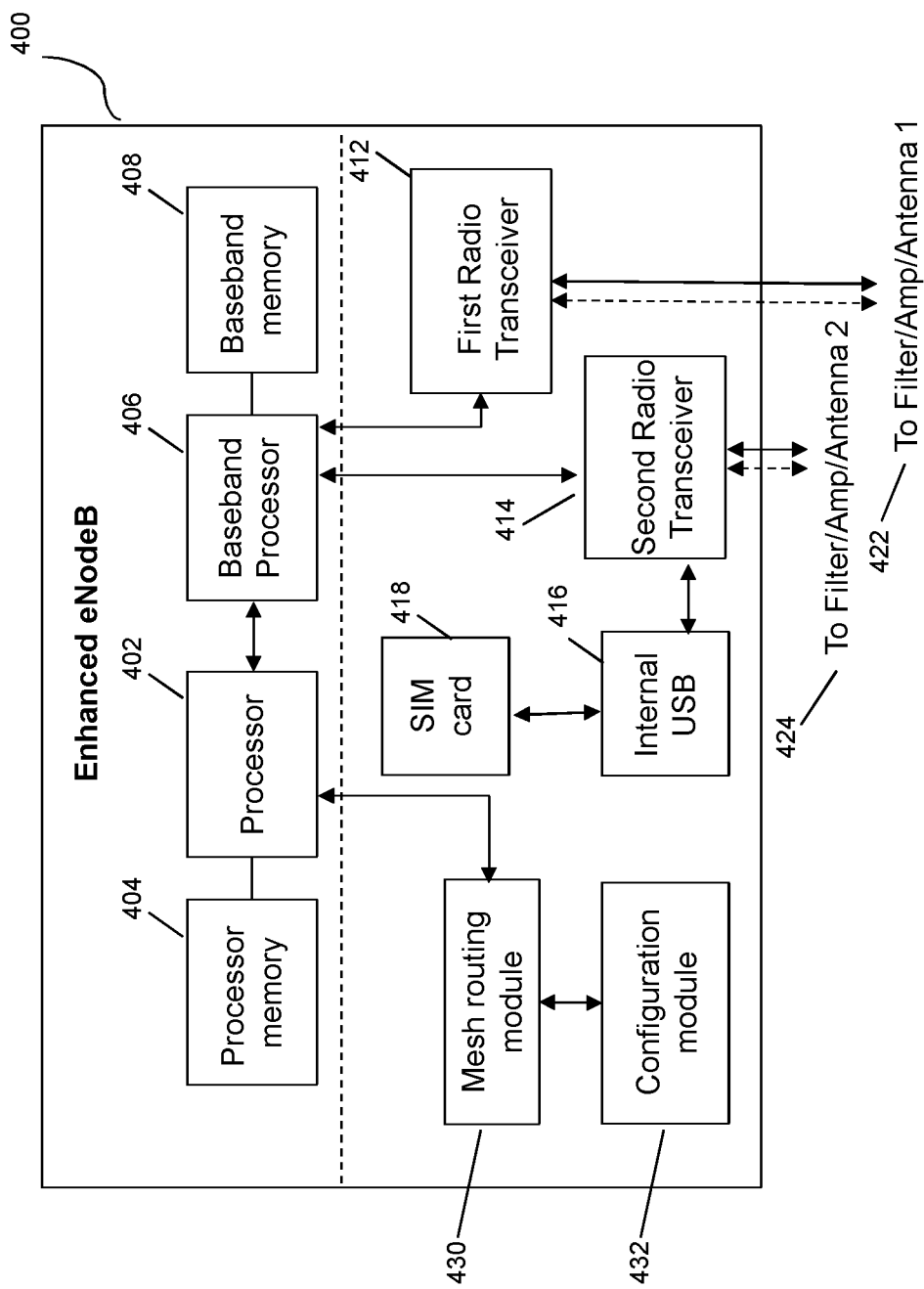
FIG. 4 is a schematic diagram of a mesh network node, in accordance with some embodiments.

FIG. 4 is a schematic diagram of a mesh network node, in accordance with some embodiments. Mesh network node 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416.

A mesh routing module 430 may also be included, and may be in communication with a configuration module 432, for handling routing tables, configuration messages from a cloud coordination server, and other configuration information. These modules may be software modules, processes, containers, or monolithic software processes. Configuration module 432 and mesh routing module 430 may each run on processor 402 or on another processor, or may be located within another device.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or another parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

Figure 5:
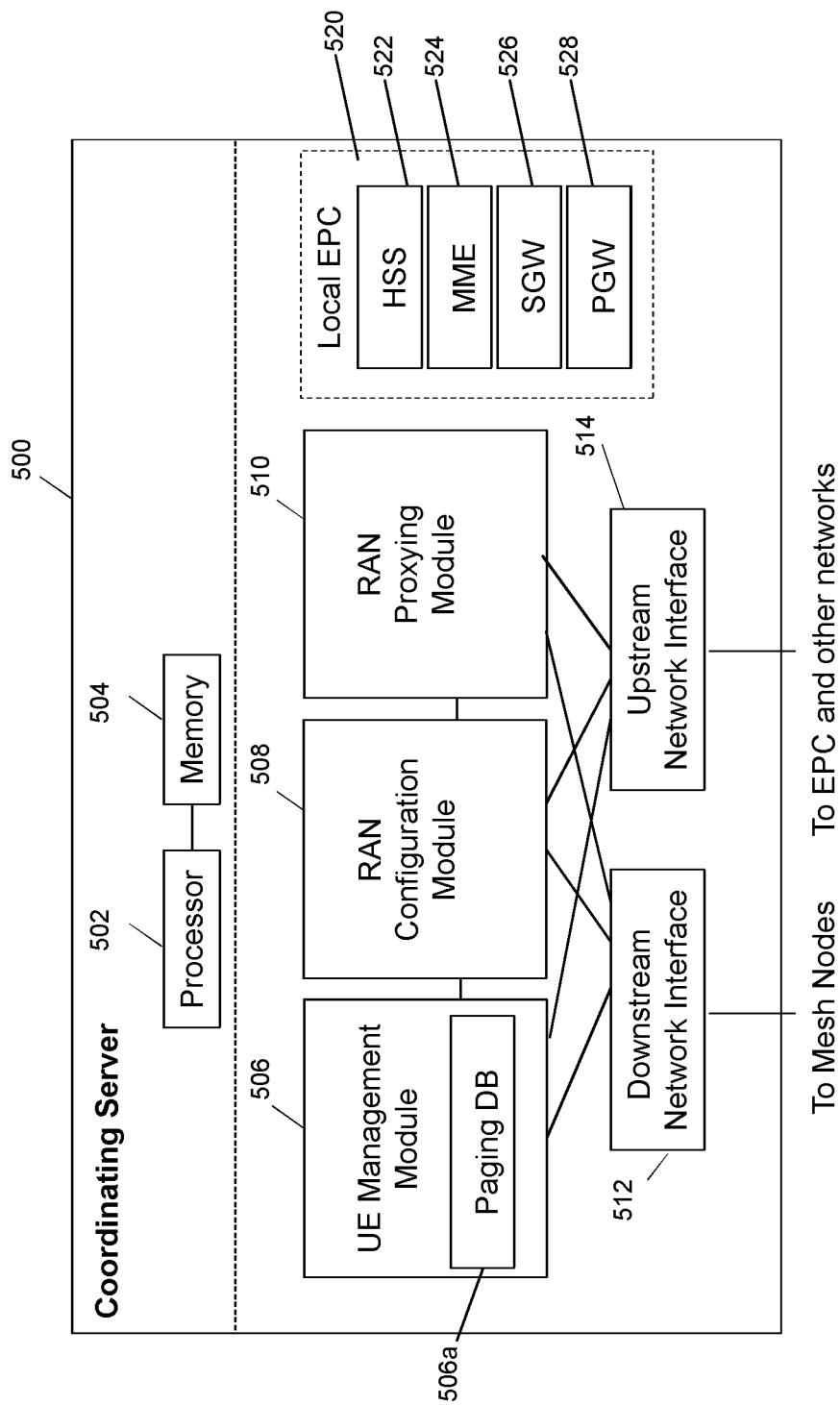
FIG. 5 is a schematic diagram of a routing coordination node, in accordance with some embodiments.

FIG. 5 is a schematic diagram of a routing coordination node, in accordance with some embodiments. Coordinator server 500 includes processor 502 and memory 504, which are configured to provide the functions described herein. Also present are radio access network coordination/routing (RAN Coordination and routing) module 506, including database 506a, RAN configuration module 508, and RAN proxying module 510. In some embodiments, coordinator server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although IMSI is described in some embodiments, other equipment identifiers could be used, in conjunction with IMSI or independently, in some embodiments. For example, TMSI, T-TMSI, S-TMSI, MMEI, IMEI, MEID, GUTI, WLAN MAC addresses, SIM ICCID, hardware serial numbers, or other identifiers could be used in conjunction with IMSI or independently. In some embodiments, when a single device is known to be on more than one RAT, all identifiers used by that device may be associated in the database described herein, and translation between identifiers may be performed when performing inter-RAT handling, in some embodiments. For example, this may be performed to enable tracking and/or paging across RATs. 2G is also contemplated as part of this disclosure.

In some embodiments, when there is Paging Request from one RAT, it has to be forwarded using that RAT only. I.e., if there is 3G paging, it can be forwarded to CWS using the same 3G RAN technology.

Although certain types of cell identifiers are described in some embodiments, other cell identifiers could be used, in conjunction or independently, in some embodiments. For example, ECGI (4G) and cell ID (3G) could be used as multi-RAT cell identifiers that identify across multiple RATs. Certain identifiers may be used as multi-RAT cell identifiers, which can identify a cell or base station across multiple RATs. In some embodiments a list or database may be maintained so that the coordinating gateway is aware which base stations are capable of which RATs, and this may be used for various purposes. One such purpose could be to send a paging message to a particular base station in the same RAT as the originally originated paging message.

Although small cell base stations are described in some embodiments, any power cells could be used in other embodiments. For example, femto cells or macro cells could be used with the disclosed invention. Mesh base stations could be used, in some embodiments, or other cells with shared backhaul, as described by U.S. Pat. Pub. No. US20140233412, hereby incorporated by reference in its entirety. In the present disclosure, the term radio access network is used to describe the cell, base station, or access point that provides access, e.g., a base station such as an eNodeB, or a Wi-Fi AP, or a multi-RAT base station capable of more than one RAT.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 2G networks, LTE-compatible networks such as 5G, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method, comprising:
    creating, at a coordinating server, a user page cache table, the user page cache table associates a user equipment (UE) identifier with a last known location of the UE and a virtual base station instance; wherein the virtual base station instance manages a plurality of base stations of the radio access technology presented by the virtual base station instance;
    creating, at the coordinating server, a neighbor relation table, the neighbor relation table associates each cell to neighbor cells;
    receiving, at the coordinating server from a core network, a paging message for a user equipment (UE), the paging message comprising a tracking area identity (TAI), the UE identifier, and the virtual base station instance;
    querying, at the coordinating server, in the user page cache table based on the UE identifier received in the paging message to identify the virtual base station instance and the last known location; and
    forwarding, from the coordinating server to the last known location of the UE, the paging message based on the queried last known location for the UE identifier received in the paging message,
    thereby making efficient use of radio resources and computing resources to page the UE; wherein the virtual base station virtualizes a plurality of different base stations to a core network using a single identifier.

2. The method of claim 1, wherein the user equipment identifier is an international mobile subscriber identity (IMSI).

3. The method of claim 1, wherein the user equipment identifier is a Serving Temporary Mobile Subscriber Identity (S-TMSI).

4. The method of claim 1, wherein the last known location is a cell-id.

5. The method of claim 1, further comprising forwarding the paging message to the user equipment via the first radio access network based on the last known location.

6. The method of claim 1, wherein the coordinating server is an evolved packet data gateway (ePDG) or trusted wireless access gateway (TWAG), and wherein the coordinating server is a gateway between a plurality of radio access network nodes and a Long Term Evolution (LTE) packet data network gateway (PGW), and wherein the coordinating server is a gateway between the plurality of radio access network nodes and a serving global packet radio service support node (SGSN).

7. The method of claim 1, further comprising receiving, at the coordinating server, an incoming paging request for a first radio access technology, and based on the queried last known location, preferentially sending a paging request to a multi-radio access technology base station supporting the first radio access technology.

8. The method of claim 1, further comprising receiving, at the coordinating server, an incoming paging request for a first radio access technology, and based on the queried last known location, preferentially sending a paging request to a multi-radio access technology base station supporting a second radio access technology.

9. The method of claim 1, further comprising querying, at the coordinating server, the neighbor relation table to determine neighbor cells of the last known location of the UE; and forwarding, from the coordinating server to the determined neighbor cells, the paging message together with the last known location of the UE.

10. The method of claim 8, wherein forwarding of the paging message from the coordinating server to the determined neighbor cells is a configurable option.

11. The method of claim 1, wherein the user page cache table is stored in a database.

12. The method of claim 1 wherein a VeNB instance at the coordinating server represents and manages base stations of 2G, 3G, 4G, 5G, Wi-Fi, or WiMax radio access technology.

13. The method of claim 1, further comprising storing the user page cache table in a database.

14. The method of claim 1 wherein the page cache table is stored in a distributed database and optimizing the paging operation across multiple coordinating servers.

* * * * *